(12) United States Patent
Miles et al.

(10) Patent No.: US 6,764,561 B1
(45) Date of Patent: Jul. 20, 2004

(54) PALLADIUM-BORON ALLOYS AND METHODS FOR MAKING AND USING SUCH ALLOYS

(75) Inventors: Melvin H. Miles, Ridgecrest, CA (US); M. Ashraf Imam, Great Falls, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/651,270

(22) Filed: Aug. 30, 2000

Related U.S. Application Data

(60) Provisional application No. 60/205,255, filed on May 19, 2000.

(51) Int. Cl.[7] .................................................. C22F 1/14
(52) U.S. Cl. ..................... 148/678; 148/538; 148/557
(58) Field of Search ............................... 148/639, 628, 148/430, 538, 539, 557

(56) References Cited

U.S. PATENT DOCUMENTS

| | | | |
|---|---|---|---|
| 2,478,225 A | 8/1949 | Atkinson | 75/10 |
| 3,515,542 A | 6/1970 | Larsen | 75/122.5 |
| 3,597,194 A | 8/1971 | Savage | 75/134 N |
| 4,046,561 A | 9/1977 | Prosen | 75/172 |
| 4,341,846 A | 7/1982 | Hough et al. | 428/670 |
| 4,396,577 A | 8/1983 | Smith, Jr. et al. | 420/580 |
| 5,518,556 A | 5/1996 | Weber et al. | 148/430 |
| 5,942,206 A | 8/1999 | Uhm et al. | 423/648.1 |

OTHER PUBLICATIONS

Sakamoto, Y.; Baba, K.; Flanagan, Ted B., The effect of alloying of palladium on the hydrogen–palladium misibility gap. Z. Phys. Chem. (Munich) (1988), 15 8(2), 223–35.*
Sakamoto, Y.; Kaneko, H.; Tsukahara, T.; Hirata, S., Diffusion of hydrogen in palladium–(cerium, yttrium, boron) alloys, Ser. Metall. (1987), 21(4), 415–20.*
Van Vlack, Elements of Material Science and Engineering, 3rd Edition, 1975, Addison–Wesley Publishing Company, Inc pp. 367–369.*

* cited by examiner

Primary Examiner—Sikyin Ip
(74) Attorney, Agent, or Firm—John J. Karasek; Joseph T. Grunkemeyer

(57) ABSTRACT

A palladium-boron composition and methods of making and using same are provided. In one aspect, the invention comprises an alloy comprising palladium and boron, the boron being in solid solution in the palladium and the alloy having a two-phase structure, wherein each phase of the two-phase structure has the same crystal structure as the other phase and has a different set of lattice parameters from the other phase such that the palladium is greatly hardened by the presence of the smaller phase crystals within the spaces between the larger phase crystals. The composition is carefully prepared by a process wherein palladium and an amount of boron sufficient to place the boron in solid solution, but insufficient to combine with the palladium, are placed together and repeatedly arc melted, cooled and turned over until sufficiently mixed. The hardened composition can be used to create thinner membranes for hydrogen purification and improved electrodes for generation of heat energy, and other electrochemical processes.

12 Claims, 4 Drawing Sheets

PALLADIUM-BORON ALLOYS AND METHODS FOR MAKING AND USING SUCH ALLOYS

This application is a non-provisional application and claims priority under a provisional application Ser. No. 60/205,255, filed on May 19, 2000.

FIELD OF THE INVENTION

The present invention generally relates to processes for the production of a high-strength alloy that may be used as a gas purification membrane, as an electrode for numerous applications including the generation of heat energy or other electrochemical processes, and more particularly to the preparation and use of two-phase palladium-boron alloys which have greater strength and hardness than other palladium metals or alloys and which thus can be advantageously utilized in a variety of applications including hydrogen purification membranes or electrodes.

BACKGROUND OF THE INVENTION

With increased use of electrical processes and hardware, processes utilizing the excellent reliability and conductivity of palladium, an extremely valuable but expensive metal, have become of increasing importance, particularly when used as an electrode. However, it has long been known that the hardness of palladium is often less than optimal for many of these processes. Accordingly, there has been a distinct need in this field to develop palladium alloy electrodes that are harder and more resilient than pure palladium while still offering the superior electrical characteristics of pure palladium.

In addition, interest has increased in the quick and efficient production of hydrogen, which has, because of its many industrial and scientific applications, assumed greater importance. Hydrogen is typically purified from surrounding gas by using a membrane permeable to hydrogen, but not to the other gases. In this process, the hydrogen passes through the membrane and is collected on the other side. With respect to hydrogen production, there is much interest in methods of increasing the hardness and durability of these membranes which are again typically composed of palladium. One proposed solution to overcoming the hardness problem would be to harden the palladium metal without affecting its hydrogen purification characteristics, which would allow for thinner membranes than those of pure palladium. This would allow either the same amount of hydrogen to be purified at a great cost savings, or a larger amount of hydrogen could be purified for the same cost. However, suitable methods for developing palladium or palladium alloys with sufficient hardness have not yet been achieved.

Further, the demand for energy increases each year while the world's natural energy sources such as fossil fuels are finite and are being used up. Accordingly, the development of alternative energy sources is very important and a number of potential new energy sources are under study. Although there have been many attempts to develop a palladium compound which can be utilized in processes to generate heat, such as through the introduction of aqueous deuterium, none of these attempts have been successful or repeatable, and there is thus a distinct need to develop palladium alloys which can be utilized for the generation of heat as a potential energy source.

Previously, it has been known to prepare single-phase alloys made of palladium and other minor elements. For example, the prior art includes various palladium alloys which include boron, such as Weber et al. U.S. Pat. No. 5,518,556 (a boron-containing surface layer), Hough et al. U.S. Pat. No. 4,341,846 (an electroless boron/palladium plating material), Smith Jr. et al.. U.S. Pat. No. 4,396,577 (a brazing alloy containing boron, palladium and other metals) and Prosen U.S. Pat. No. 4,046,561 (an alloy for porcelain applications containing boron, palladium and other metals).

However, what is lacking in the prior art is a pure boron/palladium composition of sufficient strength to be used as a reactive structure rather than a coating material, and which may be used in thin hydrogen purification membranes or as an electrode in a heat-generating process. There thus remains a distinct need to develop palladium alloys which can be utilized advantageously in a variety of applications where pure palladium is unsuitable either because of the expense or insufficient hardness.

SUMMARY OF THE INVENTION

In accordance with the invention, there is provided a two-phase alloy comprised of palladium and boron wherein the boron is in solid solution in the palladium and wherein each phase of the two-phase structure has the same crystal structure as the other phase but has a different set of lattice parameters from the other phase. In addition, a method of preparing the two-phase alloy of the invention is also provided wherein the boron in powder form is preferably placed in an airless compartment, palladium in sponge form is placed in the compartment overlying the boron, the boron and palladium are melted together to form a mixture via a heating apparatus such as an electric arc, the mixture is cooled to solidification, turned over for complete mixing, and the melting, cooling and turning process is preferably repeated until a mixture with the desired homogeneity is attained. In the preferred process, the amount of boron is such that it is insufficient to form a compound of boron in the palladium, but sufficient to remain in solid solution with the palladium.

In the particularly preferred embodiment, the composition of the present invention comprises 0.1 to 0.8 by weight percent boron, and 99.2 to 99.9 percent by weight percent palladium, and the palladium and boron comprise at least 99.9% of the composition. It is also preferred that the second phase forms crystallites which are on average at least twice as large as the crystallites of the first phase, and that the diameter of the crystallites in the first phase is in the range of 10 to 100 Angstroms.

In a particularly preferred method or preparation in accordance with the invention, the palladium and boron are placed on a copper hearth in a mixing chamber which is part of an arc melting means. The arc melting is then performed between about 2079° C. and 2200° C., for a period of between about 4 and 10 minutes. The melting, cooling and turning steps are preferably repeated roughly 3–10 times. After a complete mixture results from melting, turning, and cooling, the composition may also be swaged to reduce the diameter of the alloy. The alloy is annealed at elevated temperature to reduce the residual stress, and then undergoes a final cooling to room temperature. The annealing is performed between about 650 and 700° C., and for less than about three hours.

Preferably the alloy composition of the present invention can be formed into a membrane for use in the purification of hydrogen, or can be made into an electrode useful for numerous purposes, including the loading of the electrode with deuterium for the generation of heat energy, or other standard electrochemical purposes.

Further features and advantages of the present invention will be set forth in, or apparent from, the detailed description of preferred embodiments which follows below.

DETAILED DESCRIPTION OF THE PREFERRED EMBODIMENTS

In accordance with the present invention, there is provided a composition comprising a two-phase alloy of palladium and boron which has superior tensile strength and hardness when compared to pure palladium, and which can thus be used in a variety of applications, including use as a hydrogen purification membrane or as an electrode in numerous electrochemical processes.

Figure 1:
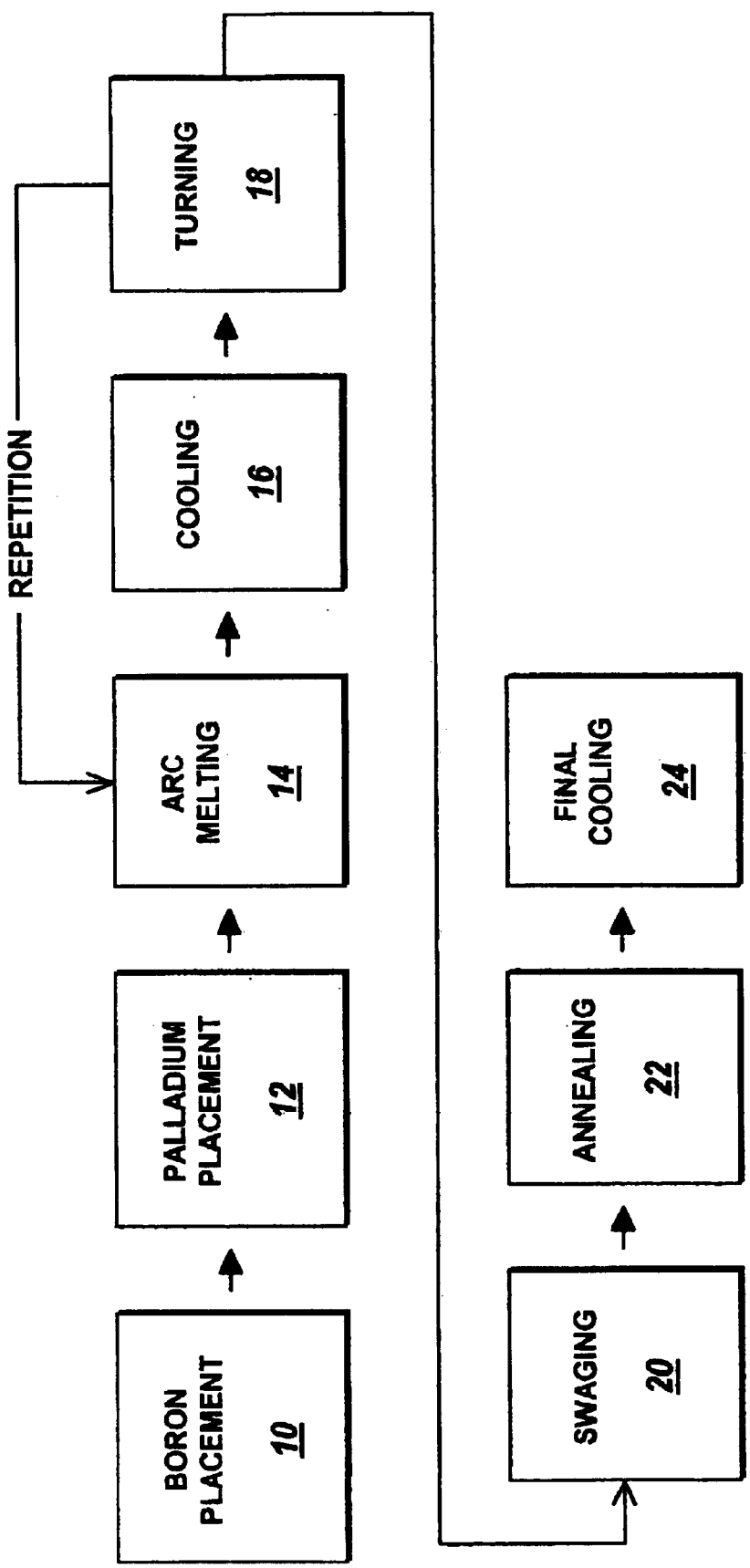
FIG. 1 is a schematic view of the process of preparing a palladium-boron alloy in accordance with the present invention.

In the preferred process of producing the palladium/boron alloy of the present invention, as shown in the flowchart of FIG. 1, there is a series of preferred steps for making the boron-palladium composition with a two-phase crystalline structure. In this preferred process, boron in powder form is first placed within a structure capable of producing heat sufficient to melt metal alloys, such as on a copper plate, or hearth, within a compartment filled with argon, after evacuation of the compartment, suitable for arc melting and cooling. Copper is preferably used as the material for the hearth because of copper's excellent conductivity for the arc melting phase. The copper hearth is cooled with water from below to keep it from melting into the alloy as it has a lower melting point than either boron or palladium. The hearth, and the mixture resting upon it, are cooled by the transfer of heat from the composition through the hearth to the coolant water. The system is not reliant on air cooling because of its water cooling means. The entire process preferably occurs in the chamber which is filled with argon gas after evacuating the chamber. Exposure to air cannot be allowed because oxygen or air would oxidize the palladium and the boron, ruining the process. The process is usually performed in a container with a noble gas, typically argon. In this process, palladium is placed in the compartment 12 so that it is overlying the boron powder in the cavity. The palladium is preferably introduced in a pure palladium sponge form.

The palladium-boron alloy produced in accordance with the present invention preferably comprises about 0.05 to 2.0 percent by weight boron, most preferably 0.1 to 0.8 weight percent, and from about 98.0 to 99.5 percent by weight percent palladium, most preferably from about 99.2 to 99.9 weight percent. The amount of boron present in the cavity is fixed so that it is small enough not to form a compound of boron in the palladium but is sufficient to react with oxygen in the palladium while the boron is in solid solution in the palladium. Very small amounts of the composite are used herein. Typically, there will be 100 g of palladium and an amount of boron in accordance with the ranges as set forth above.

In the preferred process, after the palladium and boron are placed within the cavity, a heating source such as an electric arc is used to melt the boron and palladium together to form a mixture 14. Although there are several other well-known forms of heating that would be suitable for the present invention, an electric arc is preferably used because it offers rapid control which prevents the Boron from vaporizing prematurely. The palladium is preferably placed on top of the boron because of the differences in density. The denser palladium prevents splatter or flying of the boron. Additionally, the lower melting point of palladium allows it to form a protective shell over the boron before the boron begins melting. A melting arc is generated between a tungsten tip just above the mixture and the conductive copper hearth upon which it rests.

The melting point of boron, the higher of the pair, is 2079° C. so the melting must be done at least at this temperature. However, the temperature preferably should not exceed about 2200° C. or the boron will begin to vaporize. The melting time should be about 5 minutes. A melting time greater than 10 minutes at the aforementioned temperature would result in vaporization of a portion of the boron.

After the palladium and boron are melted, the mixture is cooled The mixture solidifies upon cooling 16. The mixture is preferably turned over after cooling and solidification 18 to provide a more homogeneous mixture by preventing settling of the boron and palladium into layers. The mixture is turned over with the tungsten tip of the arc mechanism.

After the initial melting and cooling to bind the loose boron powder to the palladium, the melting step 14, cooling step 16, and turning over step 18 (as shown in FIG. 1) are repeated as often as necessary to eliminate any boron or palladium pockets, and for thoroughly mixing the mixture into a solution of a desired homogeneity to be attained suitable for commercial use. The steps are preferably repeated anywhere from about 3–10 times, with about 4–5 times particularly preferred, and the solution is then mixed by the use of a combination of gravity and random movement, followed by repeated melting, cooling and turning cooled solid solution over.

After a homogeneous mixture is prepared, the material preferably undergoes an additional step of swaging 20, if so desired, for reducing the alloy to a fixed diameter. A die is preferably used and the metal is forced into a bar shape of the appropriate diameter. Swaging is particularly useful when producing an electrode from the raw alloy material.

After the material undergoes swaging 20, the rods are cut into appropriate lengths and machined into usable electrode form. The alloy is annealed 22 to reduce the residual stress. The alloy begins at room temperature and is heated to approximately 650° C. for approximately 2 hours. The time and temperature in this step are important because too high a time or temperature would result in a larger grain size of the composition which would detract from hardness and render the composition ineffective. For example, temperatures at 700° C. and above would begin to produce undesirable results in the final alloy. Grain size would also become dangerously large after approximately 3 hours. After annealing, the solution is cooled to room temperature in a final cooling step 24.

Figure 2:
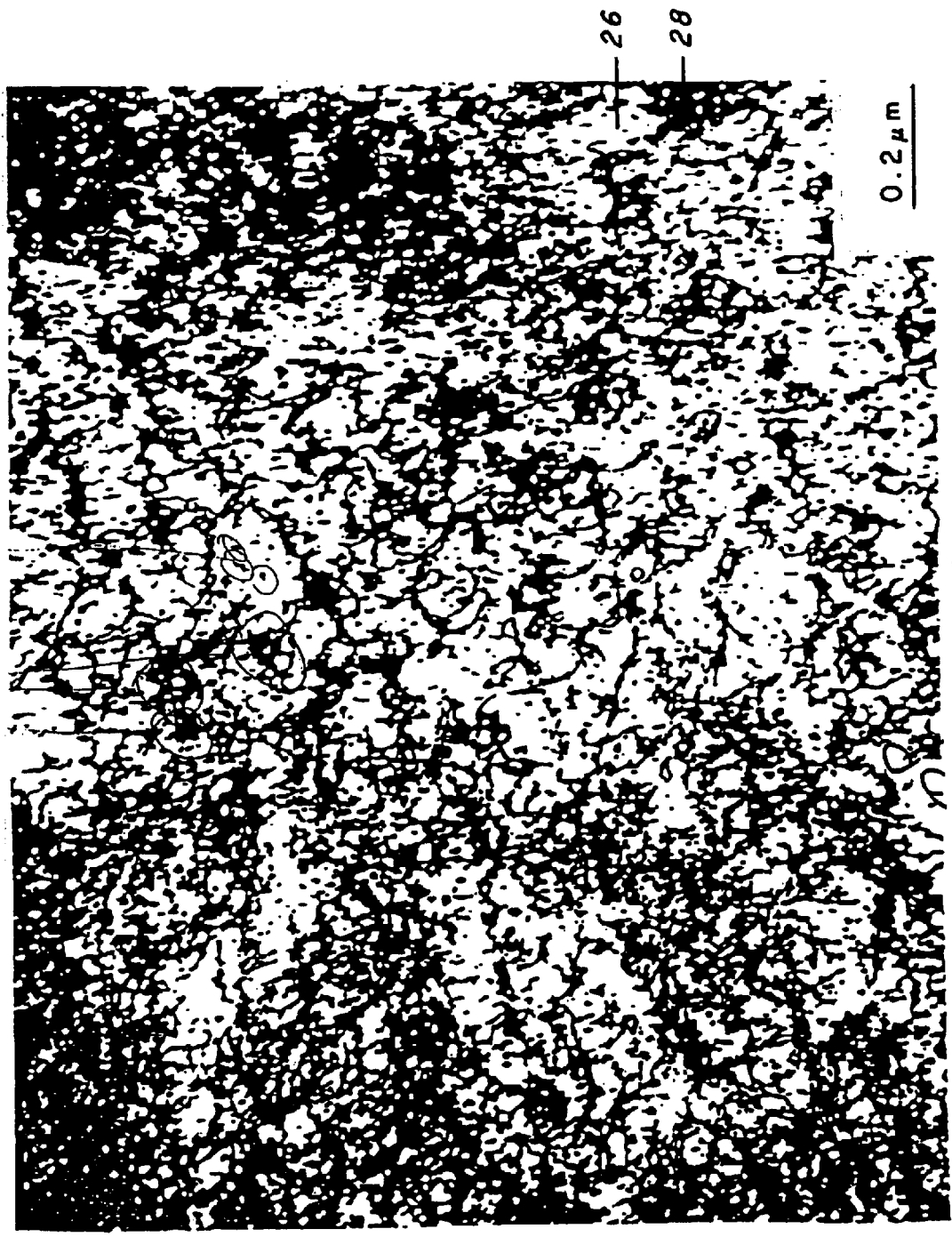
FIG. 2 is a transmission electron micrograph of a palladium/0.62% boron alloy composition in accordance with the present invention which shows the two phases.
Figure 3A:
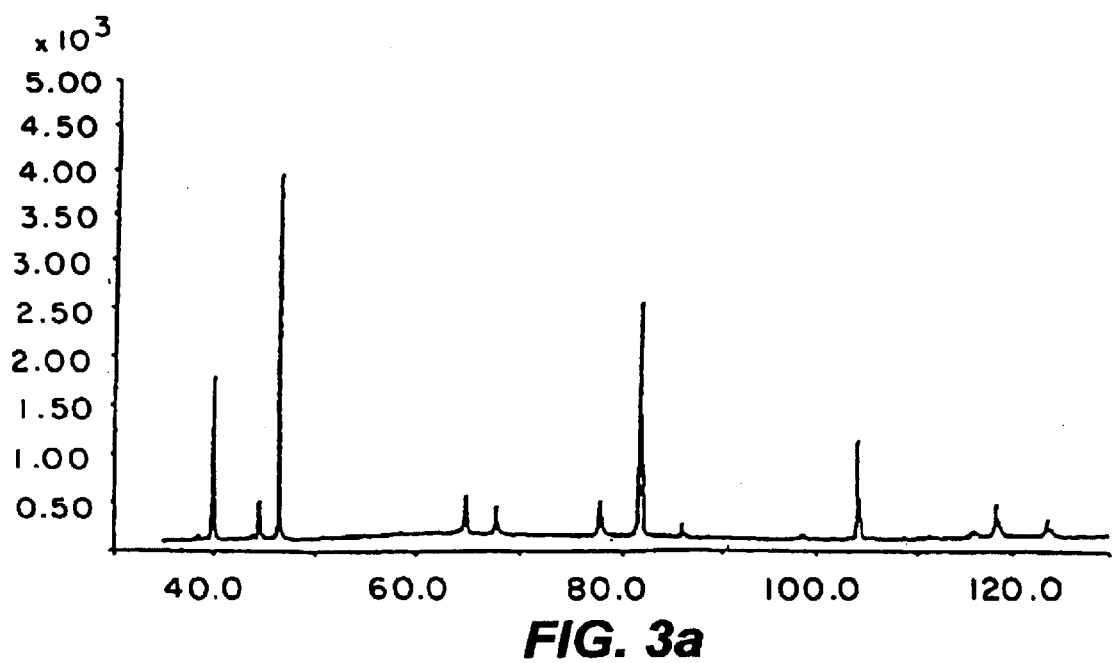
FIG. 3a is a graphic representation of an X-ray diffraction pattern of palladium/0.18% boron.
Figure 3B:
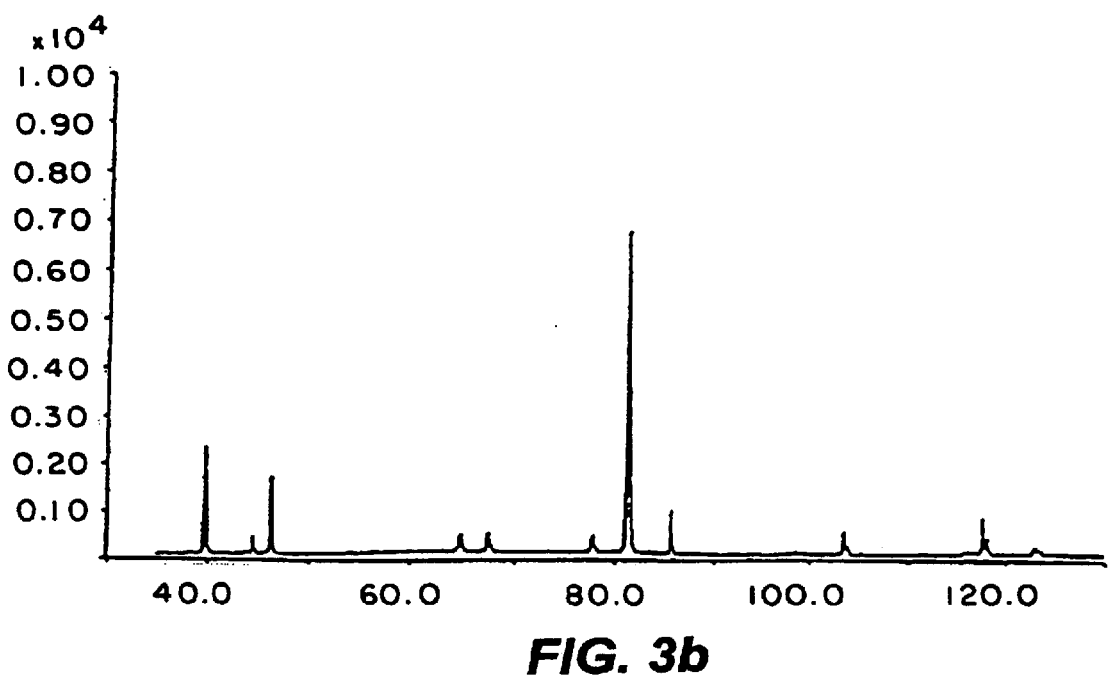
FIG. 3b is a graphic representation of an X-ray diffraction pattern of palladium/0.38% boron.
Figure 3C:
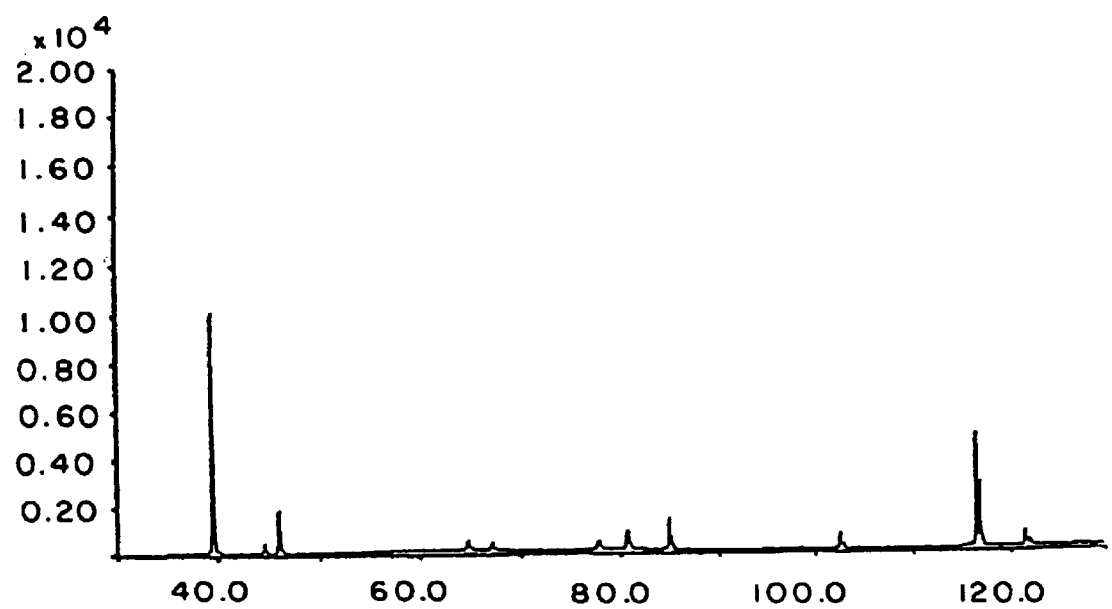
FIG. 3c is a graphic representation of an X-ray diffraction pattern of palladium/0.62% boron.
Figure 3D:
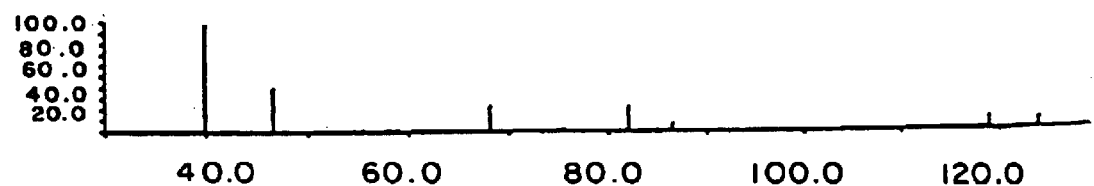
FIG. 3d is a graphic representation of an X-ray diffraction pattern of pure palladium.

The composition resulting from the above process is a boron in solid solution in the palladium, with the alloy having a two-phase structure. As shown in FIG. 2, the first and second phase, 26 and 28, respectively, of the two-phase structure have the same crystal structure but different sets of lattice parameters so that the crystals of the second phase are larger than the crystals of the first phase. The diameter of the crystallites in the first phase 26 is in the range of 10 to 100 Angstroms, whereas the diameter of the crystallites in the second phase 28 is much larger.

The differing sizes of the crystals of the phases creates a "miscibility gap" meaning that the miscibility of the two phases with each other is high because the crystals of the smaller first phase can easily rest in gaps between the larger crystals of the second phase. This "filling" of the gaps of the larger crystals binds the crystals of both phases together and results in a hardened composition.

The amount of boron in the mixture appears to be critical. It has been found that the amount of boron must be maintained below 2 weight percent of the mixture for solution. Anything more and it will begin to bond with the palladium, preventing formation of the two-phases.

This composition can show the same or better strength than pure palladium with much less thickness. This is advantageous in the creation of palladium hydrogen purification membranes because less palladium would be needed to create a membrane and achieve the same results using it. This is because sturdy membranes of much less thickness are enabled by the present invention than would be possible using palladium alone. The advantage herein is that because of the additional hardness of the palladium-boron alloy of the invention, a much smaller amount of expensive palladium may be used to provide a membrane of the same capacity compared to palladium alone. Palladium is one of the precious metals and is, therefore, very costly. This would allow much greater membrane capacity through reduced material costs. How much the thickness of the membrane would be able to be decreased with the present composition would depends upon such factors as design, gases to be purified, and the extent of purification desired.

Preferably, the hardened palladium-boron alloy can be made into a membrane to purify hydrogen. The openings in the palladium are sufficient to allow hydrogen to pass but not other gases. Therefore, palladium is commonly used to purify hydrogen using the membrane, and the gas to be purified is usually placed on one side and a vacuum is on the other. This pressure differential forces the hydrogen through the membrane to towards the vacuum. The larger gases cannot fit through the membrane and are left behind. Further, the material would be advantageous for purifying hydrogen because its increased strength offers increased overall membrane reliability.

The hardened electrode would also be advantageous for use in etching, polishing, electrochemical machining, semiconductor wafer manufacture and other electrochemical processes in which use of a hardened palladium cathode retaining superior palladium electrical characteristics is advantageous.

An additional application of the alloy, which has been borne out by experimental data is as an electrode in the generation of energy in the form of heat. In a preferred process using the alloy of the present invention in the form of an electrode, the electrode in connected to a platinum cathode and immersed in water containing deuterium. The immersed electrode is loaded with deuterium from the surrounding electrolyte. As a current is applied, excess energy from the loaded electrode in the form of heat is generated. Using the palladium-boron electrode manufactured in accordance with the present invention, excess enthalpy has been achieved, and this result has been far more reproducible than in past experiments of this type, which may result in a new energy source at low cost.

Although the invention has been described above in relation to preferred embodiments thereof, it will be understood by those skilled in the art that variations and modifications can be effected without departing from the scope and spirit of the invention.

EXAMPLES

Palladium-boron composition samples containing 0.18% boron, 0.38% boron and 0.62% boron were prepared in accordance with the invention. Palladium sponge was used as a palladium source for its high purity. The boron source was a powder commonly referred to as five-nine boron (99.999% pure boron).

In accordance with the present method, approximately 100 g of palladium and a corresponding amount of boron giving the concentrations set forth above were measured. The boron powder and palladium were placed on a copper hearth within a compartment. The compartment is airless, with an argon atmosphere. The samples were melted. A typical arc melting apparatus having 12v and 300 amps was used for the melting. The two elements used for the arc melting are a tungsten tip immediately above the sample and the copper hearth. The melting was performed at about 2100 c and the melting time was about 5 minutes. The mixture was then cooled for approximately 30 minutes and the mixture turned over. The melting, cooling and turning steps were repeated 4–5 times.

To make electrodes from the composition, the alloy was swaged to 0.4 cm diameter. The swaged rods were cut into 3.5 cm lengths and machined into usable electrode form. The samples were annealed at approximately 650 c for approximately 2 hours. The samples were cooled for two hours until they returned to room temperature.

Nine samples in electrode form were tested. This testing centered around the generation of heat with the electrode. Each palladium-boron electrode was connected to a platinum anode, and the palladium-boron cathode was then immersed in water containing deuterium. After immersion, the electrodes were then electrochemically "loaded" with hydrogen. It is believed extra loading was possible due to the two-phase structure brought about by the solution of boron within the palladium. Of nine samples tested, eight yielded positive results of heat. The results of these experiments are more repeatable than any experiment of this type completed thus far. Not surprisingly, amount of heat varied with, and had a positive relationship to, boron content.

X-ray diffraction studies were carried out to characterize the three compositions of the two-phase palladium/boron alloy in accordance with the present invention. The diffractions were obtained in a Phillips diffractometer with generator settings of 50 kV, 30 mA and a copper target. Two distinct phases of the same cubic structure were found in all three compositions of the alloy. Lattice parameters for the samples were measured. As can be seen in FIG. 3, the two distinct phases have the same crystal structure but different lattice parameters. The lattice parameter in a first phase remains constant with changes in the boron content of the alloy whereas the lattice parameter of a second phase N increases with an increase in the boron content. As the boron increased, the amount of crystals in the second phase increases at the expense of the first phase, as expected.

The 0.62% boron sample was studied with a transmission electron microscope. FIG. 2 shows the Selected Area Diffraction (SAD) pattern. Lattice parameters of the two phases 26, 28 measured from x-ray diffraction and SAD are consistent, and confirmed the production of the palladium/boron alloys in accordance with the present invention.

What is claimed is:

1. A method of preparing a composition, said method comprising the steps of:
   (a) placing boron in a compartment evacuated of air and filled with another gas;
   (b) placing palladium in a cavity overlying the boron in said compartment, wherein the amount of boron is insufficient to form a compound of boron in the palladium and is sufficient to react with oxygen in the palladium while said boron is in solid solution with said palladium;
   (c) melting the boron and palladium together to form a mixture;
   (d) cooling the mixture for producing a solidified mixture;
   (e) turning the mixture over for reversing the vertical locations of the top and bottom portions of the mixture; and
   (f) repeating steps (c) through (e) until a mixture at the desired homogeneity is attained;
   wherein the composition is a two-phase palladium-boron composition;
   wherein the composition is not annealed under conditions that substantially reduce the hardness of the composition.

2. A method according to claim 1, wherein the palladium is introduced in the form of palladium sponge and the boron is introduced in the form of a powder.

3. A method according to claim 1, wherein the boron and palladium are melted using electric arc means to create an electric arc for melting the boron and palladium.

4. A method according to claim 3, wherein the boron and palladium are placed on a copper hearth in a chamber, and wherein said copper hearth is part of the arc melting means.

5. A method according to claim 1, wherein the method further comprises swaging the mixed alloy for reducing the diameter of the alloy.

6. A method according to claim 5, wherein the method further comprises the steps of annealing the alloy for reducing residual stress, and cooling the alloy.

7. A method of preparing a palladium-boron composition according to claims 6, wherein the annealing is performed between about 650° C. and about 700° C. for less than about three hours.

8. A method according to claim 1, wherein steps a)–f) occur in the order specified.

9. A method according to claim 1, wherein the melting of the boron and palladium is carried out at a temperature between about 2079° C. and about 2200° C. for a time period between about 4 and about 10 minutes.

10. A method according to claim 1, wherein steps c) to e) are repeated about 3–10 times.

11. The method of claim 1, wherein the composition is not annealed at or above about 700° C.

12. The method of claim 1, wherein the composition is not annealed for more than about three hours at about 650° C.

* * * * *